United States Patent [19]

Kortman

[11] Patent Number: 5,752,634
[45] Date of Patent: May 19, 1998

[54] BRACKET FOR ATTACHING A CONTAINER TO A GOLF CART

[76] Inventor: Larry P. Kortman, 109 Tompkins St., Eaton Rapids, Mich. 48827

[21] Appl. No.: 723,988

[22] Filed: Sep. 30, 1996

[51] Int. Cl.[6] ..................................................... B62B 1/12
[52] U.S. Cl. ............................................ 224/274; 280/645
[58] Field of Search ............................ 224/274; 280/645, 280/652, 760, 769

[56] References Cited

U.S. PATENT DOCUMENTS

| | | |
|---|---|---|
| D. 151,008 | 9/1948 | Rycraft . |
| D. 302,887 | 8/1989 | Ackerfeldt . |
| D. 310,593 | 9/1990 | Lamarche . |
| D. 356,410 | 3/1995 | Cole . |
| 2,918,297 | 12/1959 | Peters . |
| 3,131,842 | 5/1964 | Dingle, Jr. et al. . |
| 3,735,997 | 5/1973 | Seibold et al. . |
| 3,844,459 | 10/1974 | Chambers . |
| 4,337,882 | 7/1982 | Hampton . |
| 4,452,468 | 6/1984 | Eads et al. . |
| 4,459,827 | 7/1984 | Rhodes . |
| 4,550,930 | 11/1985 | Proffit ................................ 224/274 X |
| 4,762,193 | 8/1988 | Levine . |
| 4,889,267 | 12/1989 | Bolton ................................ 224/274 |
| 4,989,816 | 2/1991 | Lamarche . |
| 4,998,743 | 3/1991 | Thielen . |
| 5,193,842 | 3/1993 | Fontenot . |
| 5,409,154 | 4/1995 | Blount ................................ 224/274 |
| 5,439,241 | 8/1995 | Nelson ............................... 280/652 X |
| 5,480,078 | 1/1996 | Verrette et al. . |

*Primary Examiner*—Renee S. Luebke
*Attorney, Agent, or Firm*—Mary M. Moyne; Ian C. McLeod

[57] ABSTRACT

A bracket (10) for mounting a container (100) on a standard, manually movable golf cart (150), is described. The bracket includes a first portion (12) and a second portion (24) which are slidably connected together. The first portion has a connector bar (16) with a mounting post (18) for mounting the first portion on the bottom end (102B) of the body (102) of the golf cart. The second portion is angled and has a support bar (28) adjacent the second end (26B). The container has sleeves (152) which mount over the second end of the second portion and allows for removably attaching the container to the bracket. When the bracket is mounted on the golf cart and the second portion is disconnected from the first portion and the first portion acts to support the bottom portion (108A) of the golf bag (108).

26 Claims, 5 Drawing Sheets

PRIOR ART

BRACKET FOR ATTACHING A CONTAINER TO A GOLF CART

BACKGROUND OF THE INVENTION

(1) Field of the Invention

The present invention relates to a bracket for attaching a container to a manually movable golf cart. In particular, the present invention relates to a bracket which is separable to allow the container to be easily detached from the golf cart without having to remove the entire bracket and which positions the container upward and outward away from the ground surface and the golf bag.

(2) Description of the Related Art

The related art has shown various container mounting means which are attached to or part of a manually movable golf cart. Illustrative are U.S. Pat. Nos. Des. 151,008 to Rycraft; Des. 302,887 to Ackerfeldt; Des. 310,593 to Lamarche; Des. 356,410 to Cole; 2,918,297 to Peters; 3,131,842 to Dingle, Jr. et al; 3,735,997 to Seibold et al; 3,844,459 to Chambers; 4,337,882 to Hampton; 4,452,468 to Eads et al; 4,459,827 to Rhodes; 4,550,930 to Proffit; 4,762,193 to Levine; 4,989,816 to Lamarche; 4,998,743 to Thielen; 5,193,842 to Fontenot; 5,409,154 to Blount and 5,480,078 to Verrette et al.

In particular, U.S. Pat. No. 4,889,267 to Bolton describes a holder for mounting a cooler to a golf cart. The holder includes an open-top box into which the cooler is friction fit. An attachment means is mounted on the bottom of the holder and is designed to mount beneath the golf bag for holding the cooler in front of the bag on the cart. The attachment means includes a bracket for slidably receiving the protrusion of the golf cart for securing the holder to the golf cart.

There remains the need for a bracket for mounting a container to a golf cart which is easily mounted on a golf cart and which allows for easy removal of the container from the golf cart and which also positions the container such that the container is easily accessible.

SUMMARY OF THE INVENTION

The bracket of the present invention allows for attaching a cooler or other container onto a manually movable golf cart. The bracket can be constructed of two sections which allows for easy attachment and removal of the cooler from the golf cart. The bracket is also angled to allow the cooler to be positioned adjacent the cooler within easy reach.

OBJECTS

It is therefore an object of the present invention to provide a bracket for mounting a container to a manually movable golf cart which is easily attached to and used with existing golf carts. Further, it is an object of the present invention to provide a bracket for mounting a container to a golf cart where the bracket has two portions which are separable so that one portion with the container attached is easily removed from the golf cart while the other portion remained mounted on the golf cart and supports the bottom portion of the golf bag. Still further, it is an object of the present invention to provide a bracket for mounting a container which is angled upward so that the container is spaced above the ground surface adjacent the golf bag. Further still, it is an object of the present invention to provide a golf cart having a bracket for mounting a container which can be easily converted to a standard golf cart. These and other objects will become increasingly apparent by reference to the following drawings and the description.

DETAILED DESCRIPTION OF THE PREFERRED EMBODIMENTS

The present invention relates to a bracket 10 for mounting a container 150 and for supporting a bottom portion of a golf bag 108 on a manually movable golf cart 100. The bracket 10 includes a first portion 12 having first and second ends 14A and 14B with at least one leg 14 extending therebetween. The first portion 12 has a mounting means 18 provided at the first end 14A. The mounting means 18 mounts on the golf cart 100. The bracket 10 also includes a second portion 24 having first and second ends 26A and 26B with at least one leg 26 extending therebetween. In the preferred embodiment, the second portion 24 is separable from the first portion 12 and removably connected at the first end 26A to the second end 14B of the first portion 12. The leg 14 of the first portion 12 is slidably connected to the leg 26 of the second portion 24. The container 150 is mounted at the second end 26B of the second portion 24. The bracket 10 is mounted on the golf cart 100 so that the container 150 is adjacent the golf bag 108 on a side opposite the golf cart 100 and the first portion 12 of the bracket 10 supports the bottom portion of the golf bag 108.

Further, the present invention relates to a support for mounting a container 150 on a manually movable golf cart 100 and for supporting a bottom portion of a golf bag 108. The support includes an angled bracket 10 having a first end 14A and a second end 26B, a mounting means 18 provided at the first end 14A of the bracket 10 for mounting the bracket 10 on the golf cart 100, and an attachment means provided at the second end 26B of the bracket 10 for attaching the container 150 to the bracket 10. The bracket 10 is mounted on the golf cart 100 so that the first end 14A of the bracket 10 supports the bottom portion of the golf bag 108 and the second end 26B of the bracket 10 extends outward away from the golf cart 100 and upward so that the container 150 is adjacent the golf bag 108 on a side opposite the golf cart 100 and spaced above the first end 14A of the bracket 10.

Further still, the present invention relates to a bracket 10 for mounting a container 150 and for supporting a bottom portion of a golf bag 108 on a manually movable golf cart 100. The bracket 10 has a first portion 12 with a pair of first, parallel legs 14 extending to separate second ends 14B from a common base 16 at a second end 14A. The base 16 is provided with a mounting means 18 for mounting the base 16 on a golf cart 100 to support the bottom portion of the golf bag 108. The bracket 10 also has a second portion 24 with a pair of second, parallel legs 26 joined together by a support means 28 intermediate first and second ends 26A and 26B of the second parallel legs 26. Each of the first ends 26A of the second, parallel legs 26 of the second portion 24 removably slide into engagement with one of the second ends 14B of the first, parallel legs 14 of the first portion 12. The container 150 is mounted on the second portion 24 at the second end 26B of each of the second, parallel legs 26.

Still further, the present invention relates to a method for converting a manually movable golf cart 100 having a lower bag support 112 mounted at a lower end 102B for supporting a bottom portion of a golf bag 108 above a ground surface into a manually movable golf cart 100 for supporting the golf bag 108 and a container 150 above the ground surface. A support is provided for mounting the container 150 on the golf cart 100. The support includes an angled bracket 10 having a first end 14A and a second end 26B. The support also includes a mounting means 18 provided at the first end 14A of the bracket 10 for mounting the bracket 10 on the golf cart 100, and an attachment means provided at the second end 26B of the bracket 10 for attaching the container 150 to the bracket 10. The bracket 10 is mounted on the golf cart 100 so that the first end 14A of the bracket 10 supports the bottom portion of the golf bag 108 and the second end 26B of the bracket 10 extends outward away from the golf cart 100 and upward with the container 150 adjacent the golf bag 108 on a side opposite the golf cart 100 and spaced above the first end 14A of the bracket 10. To attach the support to the golf cart 100, the lower bag support 112 is removed from the golf cart 100. The mounting means 18 of the bracket 10 is then attached to the lower end 102B of the golf cart 100 so that the second end 26B of the angled bracket 10 extends upward away from the ground surface. Finally, the container 150 is attached on the second end 26B of the bracket 10 so that the container 150 is adjacent the golf bag 108 when the golf bag 108 is mounted on the golf cart 100.

Further, the present invention relates to a manually movable golf cart 100 which is convertible from a standard golf cart into a container carrying golf cart 100. The golf cart 100 has a body portion 102 with opposed ends 102A and 102B with securing straps 106 mounted therebetween for securing the golf bag 108 on the golf cart 100. Wheels 110 are attached to the body portion 102 to allow for moving the golf cart 100. A handle 104 is mounted on one end 102A of the body portion 102 for pulling or pushing the golf cart 100 on the wheels 110. A first bracket 12 having a first end 14A and a second end 14B with at least one leg 14 extending therebetween is provided for mounting on the golf cart 100. A mounting means 18 is provided at the first end 14A of the bracket 10 for mounting the bracket 10 on the body portion 102. The first bracket 10 supports a bottom of the golf bag 108. A second bracket 24, separable from the first bracket 12, having first and second ends 26A and 26B with at least one leg 26 extending therebetween is removably connected at the first end 26A to the second end 14B of the first bracket 12. The leg 14 of the first bracket 12 is slidably connected to the leg 26 of the second bracket 24. The container 150 is mounted at the second end 26B of the second bracket 24. The bracket 10 is mounted on the golf cart 100 so that the container 150 is adjacent the golf bag 108 on a side opposite the golf cart 100. To convert the container carrying golf cart 100 into a standard golf cart, the second bracket 24 is removed from the first bracket 12.

Finally, the present invention relates to a method for supporting a container 150 on a manually movable golf cart 100 and for supporting a bottom portion of a golf bag 108 above a ground surface. A first bracket 12 is provided having first and second ends 14A and 14B with at least one leg 14 extending therebetween. The first bracket 12 has a mounting means 18 provided at the first end 14A perpendicular to the leg 14 of the first bracket 12. The first bracket 12 is mounted by the mounting means 18 to a lower end 102B of the golf cart 100 for supporting the bottom portion of the golf bag 108. A second bracket 24 is provided having first and second ends 26A and 26B with at least one leg 26 extending therebetween. The leg 26 of the second bracket 24 is slidably connected to the leg 14 of the first bracket 12 so that the second end 14B of the first bracket 12 is connected to the first end 26A of the second bracket 24. The golf bag 108 is mounted on the golf cart 100 so that the first bracket 12 provides support for a bottom portion of the golf bag 108. The container 150 is attached on the second end 26B of the second bracket 24 so that the container 150 is adjacent the golf bag 108 on a side opposite the golf cart 100.

Figure 1:
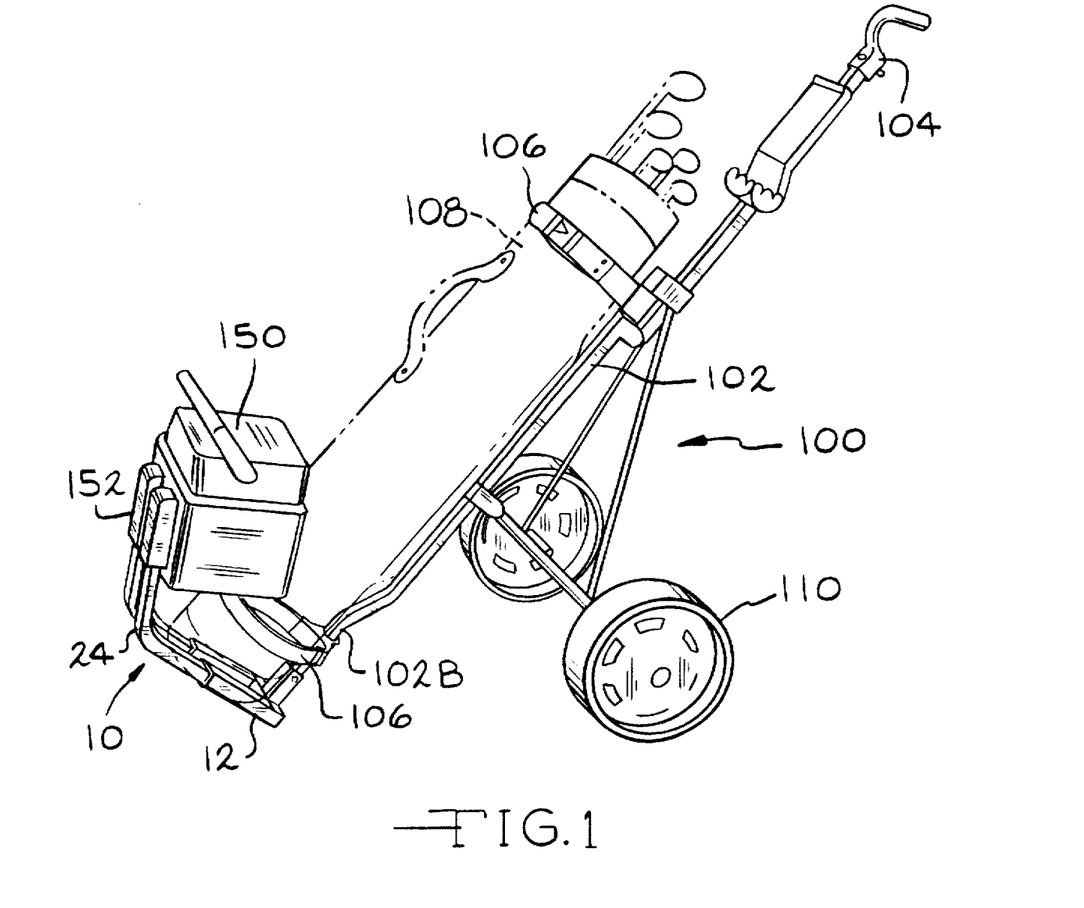
FIG. 1 is a perspective view of a golf cart 100 showing the golf bag 108 in phantom with the bracket 10 attached to the bottom end 102B of the golf cart 100.
Figure 2:
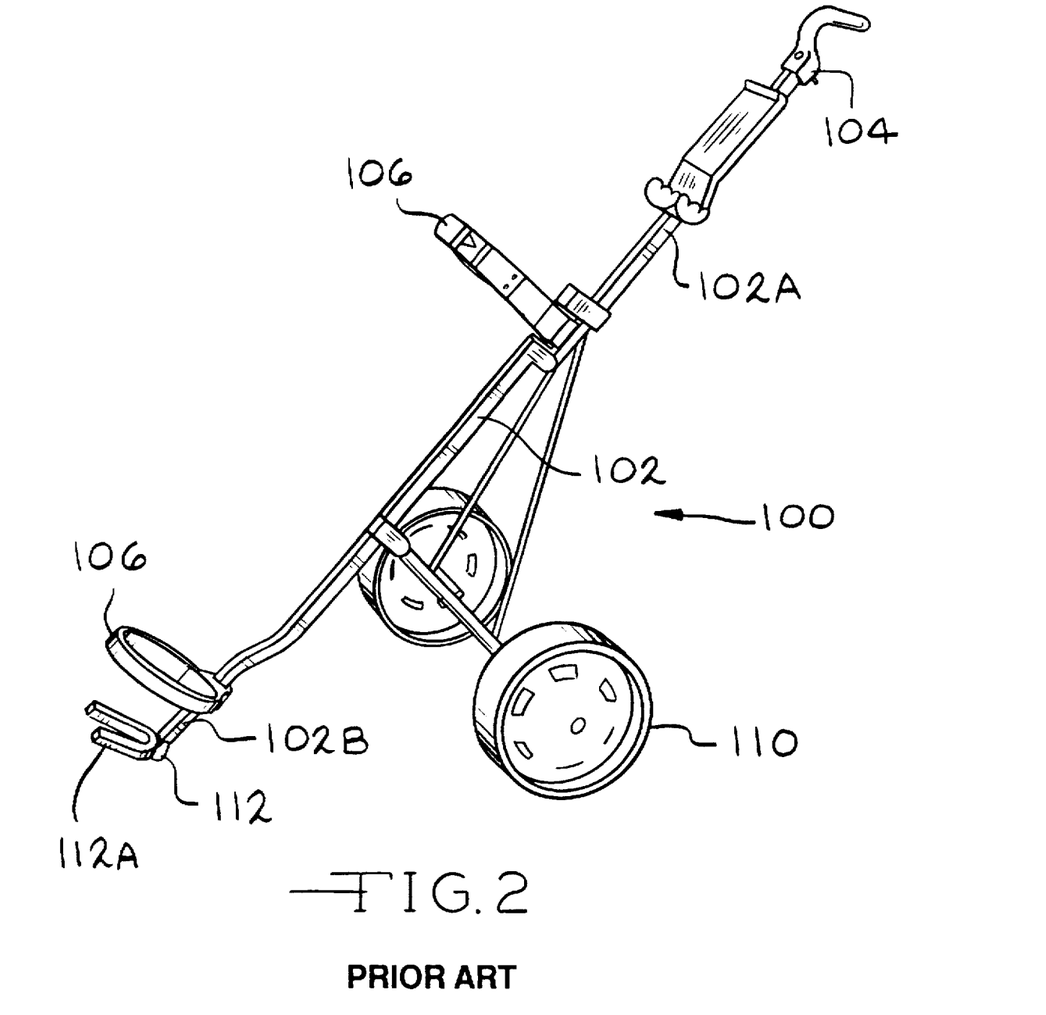
FIG. 2 is a perspective view of a standard prior art golf cart 100 showing the handle 104, the wheels 110, and the body 102 with the lower bag support 112 attached to the bottom end 102B of the body 102.
Figure 3:
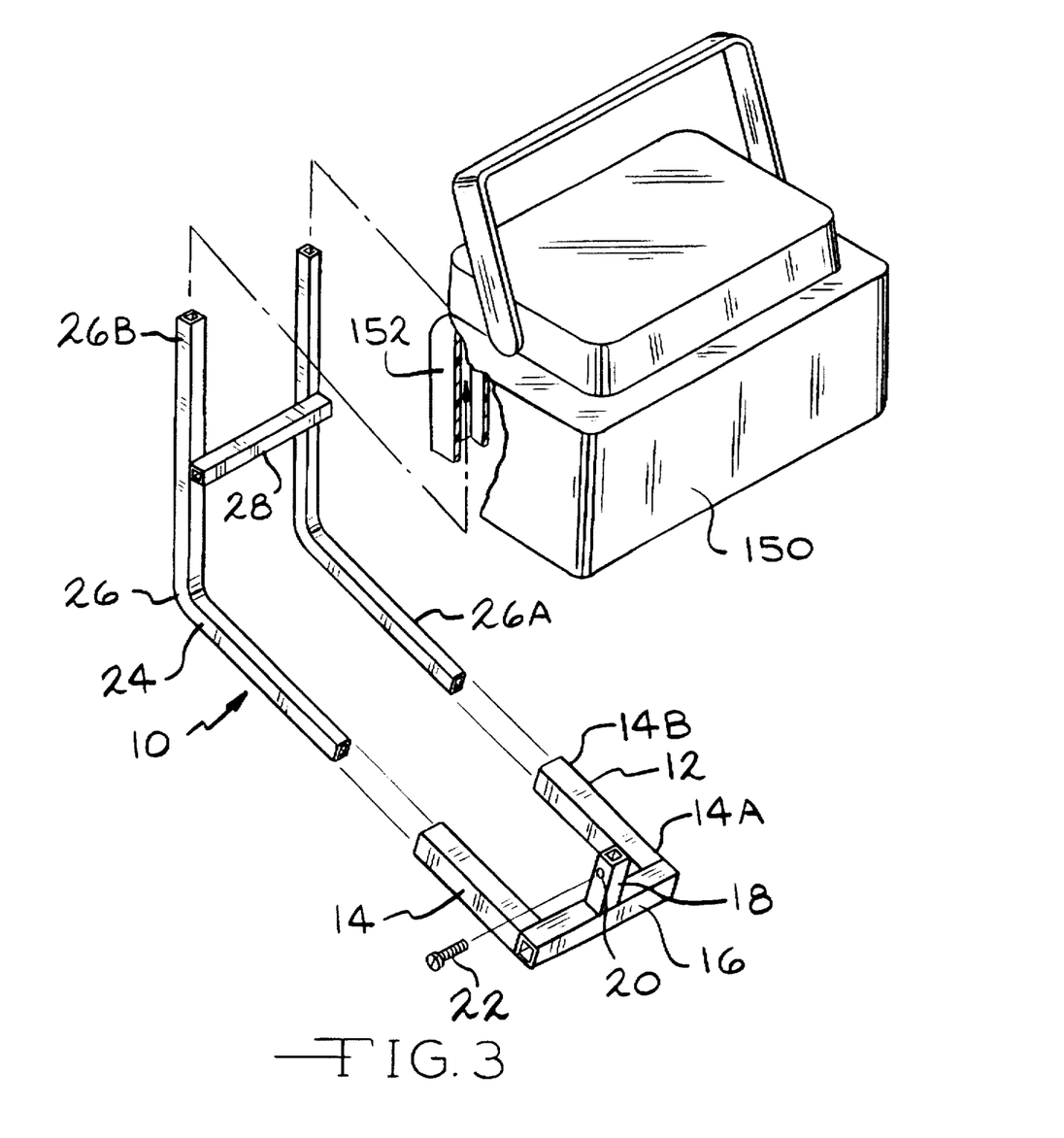
FIG. 3 is an exploded view of the bracket 10 showing the first portion 12 and the second portion 24.
Figure 4:
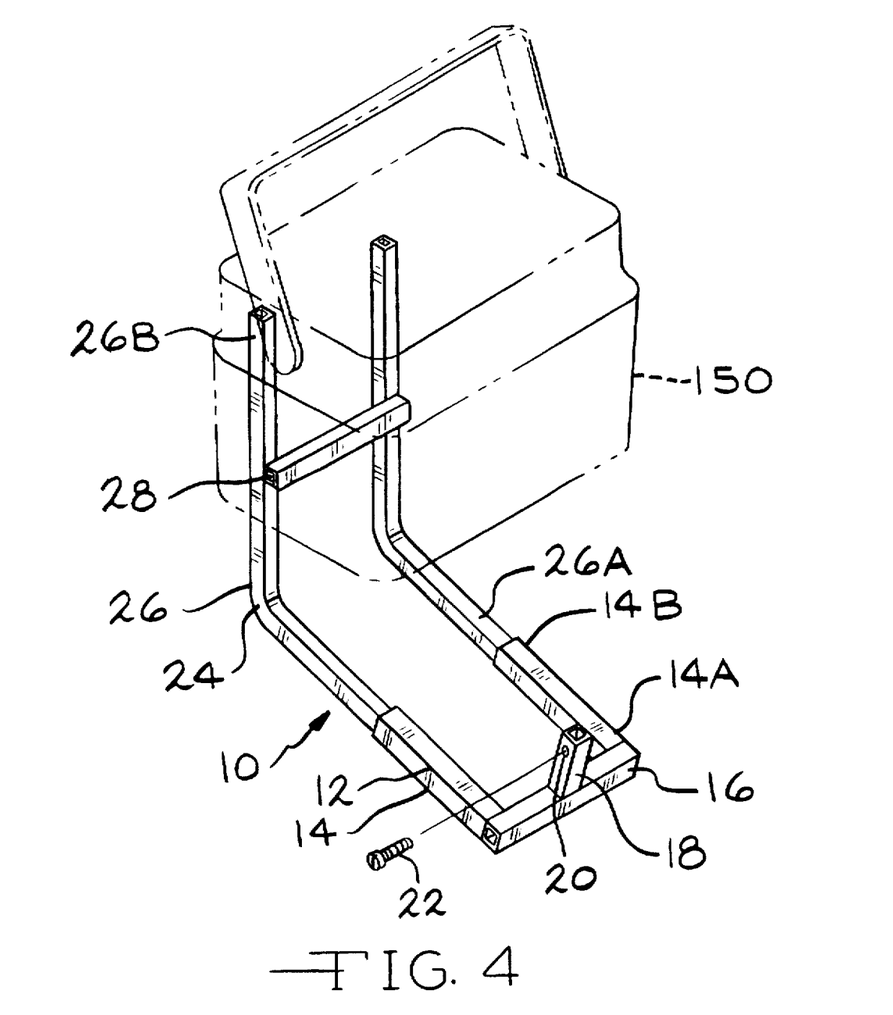
FIG. 4 is a perspective view of the bracket 10 with the container 150 in phantom.

FIGS. 3 and 4 show the bracket 10 for mounting the container 150 on a manually movable golf cart 100 of the present invention. The bracket 10 is preferably used with a standard, manually movable golf cart 100 (FIG. 1). The manually movable golf cart 100, as shown in FIG. 2, is preferably similar to those well known in the art. The golf cart 100 includes a body 102 with a top end 102A and a bottom end 102B with a handle 104 extending upward from the top end 102A. In the preferred embodiment, the body 102 essentially includes a hollow rod which has a square cross-section. The bottom end 102B of the body 102 is preferably open. However, a removable end cap (not shown) can be provided on the bottom end 102B when the bracket 10 is not attached to the golf cart 100. Securing straps 106 are provided between the ends 102A and 102B of the body 102 and act to hold the golf bag 108 in the golf cart 100. A pair of wheels 110 are attached between the ends 102A and 102B of the body 102 and allow for easy movement of the golf cart 100. The bottom end 102B of the body 102 has a lower bag support 112 for supporting a bottom portion of the golf bag 108. The bag support 112 is preferably U-shaped with parallel outward extending legs 112A and a mounting yoke (not shown) positioned at the closed end of the bag support 112 on the side opposite the legs 112A of the bag support 112. The lower bag support 112 is attached to the bottom end 102B of the body 102 by the mounting yoke such that the bottom end 102B of the body 102 of the golf cart 100 is between the legs of the mounting yoke. A pin (not shown) is extended through holes (not shown) in the yoke and in the bottom end 102B of the body 102 respectively, to secure the bag support 112 on the golf cart 100. It is understood that the bag support 112 could be of any shape and can be mounted to the body 102 in a number of ways. However, preferably the lower bag support 112 is easily removable without damaging the golf cart 100 and can be easily replaced when necessary. Also, preferably the means for mounting the lower bag support 112 to the golf cart 100 requires that a hole be located in the bottom end 102B of the body 102 of the golf cart 100.

As shown in FIG. 3, the bracket 10 includes a mounting bracket or first portion 12 and an attachment bracket or second portion 24. The first portion 12 preferably has a C-shape with a pair of parallel spaced apart legs 14 having first and second ends 14A and 14B and connected together at the first end 14A by a connector bar 16. The legs 14 extend outward from one side of the connector bar 16 in a spaced apart, parallel relationship. The legs 14 are preferably of the same size and length and are hollow with a square cross-section. The legs 14 preferably have a length of approximately 4.75 inches (12.07 cm) and a cross-sectional size of approximately 1.00×1.00 inches (2.54×2.54 cm). The connector bar 16 preferably extends completely across the first end 14A of the legs 14. The connector bar 16 preferably has the same cross-sectional size as the legs 14. The connector bar 16 preferably has a length of approximately 4.75 inches (12.07 cm) such that the legs 14 are spaced approximately 3.00 inches (7.62 cm) apart. The size and shape of the first portion 12 can be varied. In addition, it is understood that the length and size of the legs 14 and connector bar 16 may vary depending upon the type of container 150 and the type of golf cart 100 used.

A mounting post 18 having opposed ends is mounted at one end on the connector bar 16 and extends upward, perpendicular to the connector bar 16. The mounting post 18 is preferably positioned an equal distance from each of the legs 14 of the first portion 12 and preferably forms a 90° with the legs 14. The mounting post 18 is preferably hollow with a square cross-section of the size approximately 1.00× 1.00 inches (2.54×2.54 cm) and a length of approximately 3.00 inches (7.62 cm). The end of the mounting post 18 opposite the connector bar 16 has a hole 20 which extends completely through the post 18. A fastening pin 22 is provided for attaching the mounting post 18 and the first portion 12 to the bottom end 102B of the body 102 of the golf cart 100. In the preferred embodiment, the fastening pin 22 is the same pin used to mount the lower bag support 112 on the golf cart 100. Other types of mounting posts or mounting means may also be used depending upon the particular golf cart 100 which is used.

The second portion 24 preferably includes a pair of parallel, spaced apart legs 26 having first and second ends 26A and 26B and connected together adjacent the second ends 26B by a support bar 28. The legs 26 are preferably similar in size and shape. The legs 26 each have an inside angle of between about 120° and 160° such that the second portion 24 has an angled shape. The legs 26 are preferably hollow with a length of approximately 18.0 inches (45.72 cm). The angle in the legs 26 is preferably equally spaced between the ends 26A and 26B of the legs 26. The legs 26 have a square cross-section with a size of approximately 0.50×0.50 inches (1.27×1.27 cm). In the preferred embodiment, the legs 26 preferably originally have the same cross-sectional size and shape as the legs 14 of the first portion 12. However, the legs 26 of the second portion 24 are crimped in order to reduce the cross-sectional size of the legs 26. The support bar 28 has a length of approximately 5.50 inches (13.97 cm) such that the legs 26 are spaced a distance of about 3.00 inches (7.62 cm) apart. The support bar 28 is positioned about 4.00 inches (10.16 cm) from the second end 26B of the legs 26. The support bar 28 is positioned so that the bar 28 is on the inside of the angled second portion 24. In an alternate embodiment (not shown), the legs 26 have holes (not shown) between the second end 26B and the support bar 28 which extend completely through the legs 26 perpendicular to the connector bar 16. The holes allow for mounting a pair of screws (not shown) for securing the container 150 on the legs 26.

Figure 5:
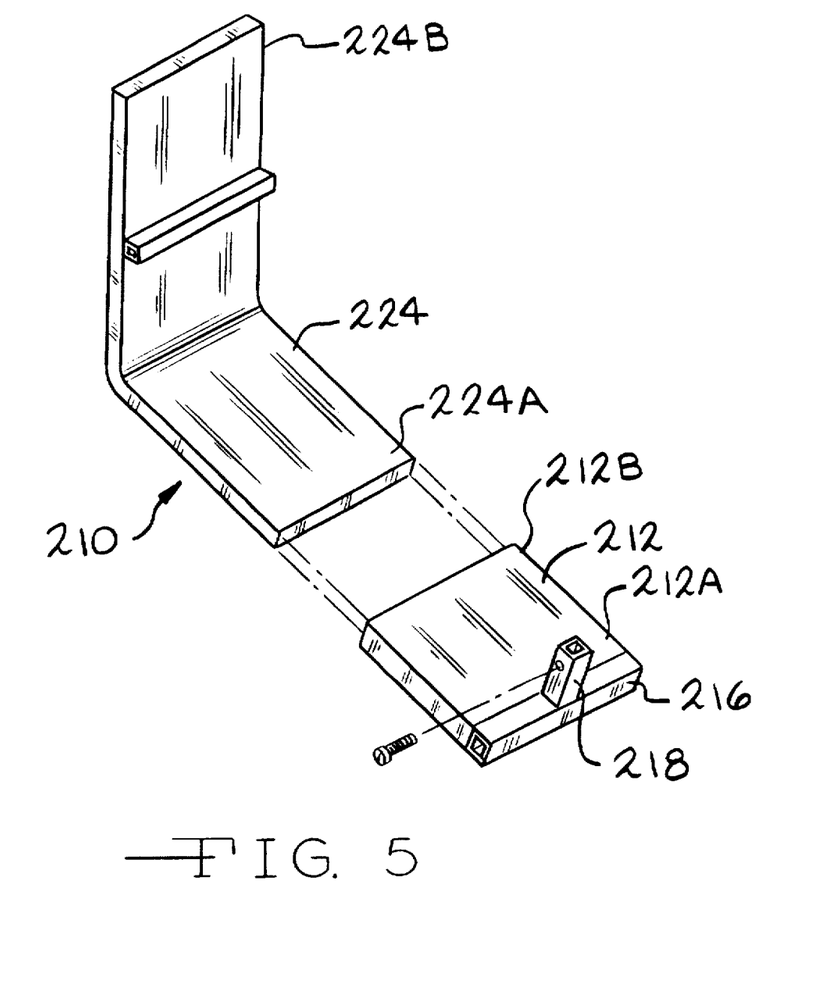
FIG. 5 is an exploded view of the bracket 210 of the alternate embodiment.

FIG. 5 shows an alternate embodiment of the bracket 210 for mounting the container (not shown) on the golf cart 100. The bracket 210 includes a first portion 212 and a second portion 224. The first portion 212 of the alternate embodiment is similar in shape to the first portion 12 of the preferred embodiment. However, the first portion 212 of the alternate embodiment is a single piece having a rectangular shape with first and second ends 212A and 212B and a hollow interior. Preferably, the second end 212B is open. The connector bar 216 and mounting post 218 are preferably similar to the connector bar 16 and mounting post 18 of the preferred embodiment and are mounted at the first end 212A of the first portion 212. The alternate bracket 210 is preferably mounted on the bottom end 102B of the body 102 of the golf cart 100 similar to the mounting of the bracket 10 of the preferred embodiment. The second portion 224 of the bracket 210 of the alternate embodiment is angled similarly to the second portion 24 of the preferred embodiment. However, the second portion 224 of the bracket 210 of the alternate embodiment is a unitary piece or sheet having a first end 224A and a second end 224B. The width and thickness of the second portion 224 is such that the first end 224A of the second portion 224 is able to easily slide into the hollow interior of the first portion 212 at the first end 212A.

The container 150 is preferably a cooler for carrying cold beverages and is similar to six-pack plastic coolers well known in the art such as the 5-quart ice chest made by Rubbermaid, Incorporated of Wooster, Ohio. However, it is understood that the container 150 could be of any type for any use. The size of the container 150 must be such as to not interfere with the golf bag 108 when the golf bag 108 and the container 150 are both mounted on the golf cart 100. The container 150 must also be of a weight which allows the golf cart 100 to be moved easily while the golf bag 108 is full and the container 150 is full.

In the preferred embodiment, the container 150 has sleeves 152 with an open bottom and a closed top along one side of the container 150 (FIGS. 1 and 3). The sleeves 152 allow for removably mounting the container 150 on the second ends 26B of the legs 26 of the second portion 24. In the alternate embodiment, the container has a single sleeve on one side which allows for mounting the container on the second end 224B of the second portion 224 of the bracket 210 (FIG. 5). In another alternate embodiment (not shown), the container has holes on one side which allow for mounting screws which are inserted through holes in the second end of the legs of the bracket and into the container. The container 150 and the second portion 24 of the bracket 10 can also be constructed as a unitary piece.

It is understood that the legs of the brackets could be of any cross-sectional shape. However, the brackets must be able to be easily connected together. In another alternate embodiment (not shown), the first portion 12 and second portion 24 are a unitary piece. In that case, the size and shape of the legs can be varied. The bracket is preferably constructed of steel however, any durable material such as plastic or aluminum could be used.

IN USE

The bracket 10 preferably can be used with any standard, manually movable golf cart 100 (FIG. 2) which has a removable lower bag support 112. To mount the bracket 10 on the golf cart 100, the lower bag support 112 is first removed from the bottom end 102B of the body 102 of the golf cart 100. To remove the lower bag support 112, the securing pin is removed and the lower bag support 112 is pulled away from the body 102 of the golf cart 100. The bracket 10 can then be mounted on the body 102 of the golf cart 100.

To mount the bracket 10, the first portion 12 and the second portion 24 are preferably separated (FIG. 3). The first portion 12 is mounted on the open bottom end 102B of the body 102 by inserting the mounting post 18 into the open bottom end 102B of the body 102 of the golf cart 100. If necessary, the end cap is first removed from the bottom end 102B of the body 102. The mounting post 18 and the body 102 preferably have the same cross-sectional shape. The mounting post 18 is slightly smaller in size than the body 102 such that the mounting post 18 easily slips into the bottom end 102B of the body 102. The square cross-section of the body 102 and the mounting post 18 prevent the bracket 10 from rotating. The first portion 12 is secured to the body 102 by insertion of the fastening pin 22 through the holes 20 in the body 102 and the mounting post 18. When the first portion 12 is positioned on the body 102 of the golf cart 100 and the golf cart 100 is at rest, the connector bar 16 is in contact with the ground surface and the legs 24 of the first portion 12 are at a 90° angle with the body 102 of the golf cart 100. The legs 24 of the first portion 12 extend upward at an angle away from the ground surface. In the preferred embodiment, the legs 14 of the first portion 12 extend upward at an angle of about 20° to 30° away from the ground surface (FIG. 1). The legs 14 of the first portion 12 are preferably perpendicular to the bottom end 102B of the body 102 of the golf cart 100.

Next, the second portion 24 is attached to the first portion 12. The second portion 24 can be mounted to the first portion 12 either before or after the golf bag 108 is mounted onto the golf cart 100. The second portion 24 is mounted on the first portion 12 by slipping each of the legs 26 of the second portion 24 into each of the open second ends 14B of the legs 14 of the first portion 12. The legs 26 of the second portion 24 have the same cross-sectional shape and are slightly smaller than the legs 14 of the first portion 12 which allows the second portion 24 to be easily connected to the first portion 12. When the second portion 24 is securely mounted in the first portion 12, the legs 14 adjacent the first end 26A of the second portion 24 extend upward at an angle similar to the angle of the legs 14 of the first portion 12. Preferably, no additional means of securing the second portion 24 in the first portion 12 is needed due to the angle of the legs 14 and the force of gravity acting on the legs 26 of the second portion 24. When first and second portions 12 and 24 of the bracket 10 are correctly connected together, the first end 26A of the legs 26 of the second portion 24 are coaxial with the second end 14B of the legs 14 of the first portion 12. In the alternate embodiment shown in FIG. 5, the first end 224A of the second portion 224 of the bracket 210 slides into the entire open second end 212B of the first portion 212 of the bracket 210. It is understood that the first and second portions 12 and 24 of the bracket 10 may be slidably connected together in any number of ways well known in the art.

The container 150 is then mounted on the second end 26B of the legs 26 of the second portion 24 of the bracket 10 (FIG. 4). The sleeves 152 of the container 150 are slid over the second ends 26B of the legs 26 of the second portion 24 which acts to hold the container 150 on the legs 26 and the bracket 10. In the alternate embodiment of FIG. 5, the single sleeve of the container is slid over the second end 224B of the second portion 224 of the bracket 210. The container 150 is preferably mounted such that the bottom of the container 150 rests on the support bar 28 which helps to keep the container 150 correctly positioned. In another alternate embodiment, the container is preferably attached to the second ends of the legs of the second portion by screws which extend through holes in the legs and into the container.

The angle of the legs 26 of the second portion 24 allows the container 150 to be spaced apart from the golf bag 108 but does not cause the golf cart 100 to tip over forward when the golf bag 108 is removed and the container 150 is full. The length of the legs 26 of the second portion 24 and the position of the angle between the ends 26A and 26B of the legs 26 allows the container 150 to be spaced approximately 9.00 inches (22.86 cm) in front of the body 102 of the golf cart 100 and at least 9.00 inches (22.86 cm) above the ground surface. The mounting angle of the bracket 10 adds additional height to the spacing of the container 150. The container 150 is spaced upward away from the bottom end 102B of the body 102 of the golf cart 100 and away from the ground surface to allow for easier access to the container 150 when mounted on the golf cart 100. To use the golf cart 100 without the container 150 or to easily fill the container 150 away from the golf cart 100, the container 150 and the second portion 24 are removed from the golf cart 100. The container 150 and second portion 24 are removed by pulling on the legs 26 of the second portion 24 adjacent the angle such as to slide the legs 26 of the second portion 24 out of the legs 14 of the first portion 12 (FIG. 3). The first and second portions 212 and 224 of the bracket 210 of the alternate embodiment of FIG. 5 are separated in a similar manner. When the second portion 24 is disconnected from the first portion 12, the golf cart 100 with the first portion 12 still attached can be used as a standard golf cart 100. The first portion 12 acts as the lower bag support 112 to support the bottom portion 108A of the golf bag 108. Therefore, there is no need to remove the first portion 12 when the container 150 is not used.

It is intended that the foregoing description be only illustrative of the present invention and that the present invention be limited only by the hereinafter appended claims.

I claim:

1. A bracket for mounting a container and for supporting a bottom portion of a golf bag on a manually movable golf cart, which comprises:

(a) a first portion having first and second ends with at least one leg extending therebetween, the first portion having a securing means provided at the first end, for immovably securing the first portion on the golf cart; and (b) a second portion separable from the first portion, having first and second ends with at least one leg extending therebetween and removably connected at the first end to the second end of the first portion wherein the leg of the first portion is slidably connected to the leg of the second portion; and wherein the container is to be mounted at the second end of the second portion and the bracket is mounted on the golf cart so that the container is adjacent the golf bag on a side of the golf bag opposite the golf cart and the first portion of the bracket supports the bottom portion of the golf bag and the container is detachable from the golf cart by detaching the second portion from the first portion of the bracket.

2. The bracket of claim 1 wherein the second portion is angled so that when the first end of the second portion is mounted on the second end of the first portion, the second end of the second portion extends outward and upward away from the second end of the first portion.

3. The bracket of claim 2 wherein the angle of the second portion is between about 120° and 160°.

4. The bracket of claim 1 wherein a support bar is mounted adjacent the second end of the second portion and provides support for the container.

5. The bracket of claim 1 wherein the bracket has attachment sleeves which slide over the second end of the second portion of the bracket and which are configured to be mounted on the container for mounting the container on the bracket.

6. The bracket of claim 1 wherein the mounting means includes a first bar which extends across the first end of the first portion and a second bar which extends upward from the first bar perpendicular to the leg of the first portion and allows for mounting the bracket on the golf cart.

7. The bracket of claim 1 wherein the first portion has a pair of parallel, spaced apart legs and the second portion has a pair of parallel, spaced apart legs and wherein each of the legs of the first portion is slidably connected into one of the legs of the second portion to separably connect the first portion and second portion together.

8. A support for mounting a container on a manually movable golf cart and for supporting a bottom portion of a golf bag, which comprises:

(a) a bracket having a first end angled with respect to a second end;

(b) a mounting means provided at the first end of the bracket for mounting the bracket on the golf cart; and (c) an attachment means provided at the second end of the bracket for attaching the container to the bracket in spaced apart relation from the angle between the ends of the bracket wherein the bracket is mounted on the golf cart 50 that the first end of the bracket supports the bottom portion of the golf bag and the second end of the bracket extends outward away from the golf cart and upward so that the container is adjacent the golf bag on a side opposite the golf cart and spaced above the first end of the bracket.

9. The support of claim 8 wherein the attachment means is a sleeve which is configured to be attached to a side of the container and which mounts on the second end of the bracket so that the container is adjacent the golf bag.

10. The support of claim 8 wherein the mounting means is a post which extends upward away from the bracket perpendicular to the first end of the bracket.

11. The support of claim 10 wherein the post has a square cross-section and is used to mount the bracket on the golf cart by inserting the bar into an open bottom end of the golf cart.

12. The support of claim 11 wherein the bracket, adjacent the first end, acts to support a bottom of the golf bag when the support is mounted on the golf cart.

13. The support of claim 8 wherein a support bar is mounted on the bracket adjacent the second end of the bracket and acts to support the container when the container is mounted on the support.

14. The support of claim 8 wherein the bracket has a first portion and a second portion which are separable.

15. The support of claim 14 wherein the first portion has a pair of parallel, spaced apart legs and the second portion has a pair of parallel, spaced apart legs and wherein each of the legs of the first portion is slidably connected into one of the legs of the second portion to separably connect the first portion and second portion together.

16. The support of claim 8 wherein an angle between the first end and the second end of the bracket is between about 120° and 160°.

17. The support of claim 16 wherein the bracket has a length of 18.0 inches (45.7 cm) and wherein the angle is spaced 9.00 inches (22.86 cm) from the first end so that the bracket extends away from the golf cart a distance of 9.00 inches (22.86 cm) and upward a distance of 9.00 inches (22.86 cm).

18. A bracket for mounting a container and for supporting a bottom portion of a golf bag on a manually movable golf cart, which comprises:

(a) a first portion with a pair of first, parallel legs extending to separate first ends from a common base at a second end, the base being provided with a securing means for immovably securing the base on a golf cart to support the bottom portion of the golf bag; and (b) a second portion with a pair of second, parallel legs joined together by a support means intermediate first and second ends of the second parallel legs, wherein each of the first ends of the second, parallel legs of the second portion removably slide into engagement with one of the second ends of the first, parallel legs of the first portion, wherein the second portion at the second end of each of the second, parallel legs is configured for mounting the container and wherein the container is detachable from the golf cart by detaching the second portion from the first portion.

19. The bracket of claim 18 wherein the mounting means is perpendicular to the first legs of the first portion.

20. A method for converting a manually movable golf cart having a lower bag support mounted at a lower end for supporting a bottom portion of a golf bag above a ground surface into a manually movable golf cart for supporting and the golf bag and a container above the ground surface, which comprises:

(a) providing a support for mounting the container on the golf cart, which comprises: an angled bracket having a first end and a second end; a mounting means provided at the first end of the bracket for mounting the bracket on the golf cart; and an attachment means provided at the second end of the bracket for attaching the container to the bracket wherein the bracket is mounted on the golf cart so that the first end of the bracket supports the bottom portion of the golf bag and the second end of the bracket extends outward away from the golf cart and upward so that the container is adjacent the golf bag on a side opposite the golf cart and spaced above the first end of the bracket;

(b) removing the lower bag support from the golf cart;

(c) attaching the mounting means of the bracket on the lower end of the golf cart so that the second end of the angled bracket extends upward away from the ground surface; and (d) attaching the container on the second end of the bracket so that the container is adjacent the golf bag when the golf bag is mounted on the golf cart.

21. The method of claim 20 wherein the bracket has a first portion and a second portion which are separable, wherein the first portion is mounted on the golf cart and the container is mounted on the second portion and wherein the container and second portion are separable from the first portion and the golf cart and wherein after the second portion is separated from the first portion and the golf cart, the golf cart and first portion are used similar to a standard golf cart with the first portion acting as the lower bag support for supporting the golf bag.

22. The method of claim 20 wherein the attachment means is at least one sleeve which is configured to be mounted on a side of the container and wherein the container is attached to the bracket by sliding the sleeve over the second end of the bracket.

23. A manually movable golf cart which is convertible from a standard golf cart into a container carrying golf cart, which comprises:

(a) a body portion having opposed ends with securing straps mounted therebetween for securing the golf bag on the golf cart;

(b) wheels attached to the body portion to allow for moving the golf cart;

(c) a handle mounted on one end of the body portion for pulling or pushing the golf cart on the wheels;

(d) a first bracket having a first end and a second end with at least one leg extending therebetween with a mounting means provided at the first end of the bracket for mounting the bracket on the body portion wherein the first bracket supports a bottom of the golf bag; and (e) a second bracket, separable from the first bracket, having first and second ends with at least one leg extending therebetween and removably connected at the first end to the second end of the first bracket wherein the leg of the first bracket is slidably connected to the leg of the second bracket, wherein the container is to be mounted at the second end of the second bracket and the bracket is mounted on the golf cart so that the container is adjacent the golf bag on a side opposite the golf cart; and wherein to convert the container carrying golf cart into a standard golf cart, the second bracket is removed from the first bracket.

24. The golf cart of claim 23 wherein the second bracket is angled so that when the second bracket is connected to the first bracket to form the container carrying golf cart, the second bracket extends upward towards the handle of the golf cart such that the container is spaced between the first bracket and the handle.

25. A method for supporting a container on a manually movable golf cart and for supporting a bottom portion of a golf bag above a ground surface, which comprises:

(a) providing a first bracket having first and second ends with at least one leg extending therebetween, the first bracket having a securing means provided at the first end perpendicular to the leg of the first bracket for immovably securing the first portion on the golf cart;

(b) securing the first bracket at the securing means on a lower end of the golf cart for supporting the bottom portion of the golf bag;

(c) providing a second bracket separate from the first bracket and having first and second ends with at least one leg extending therebetween;

(d) slidably connecting the leg of the second bracket to the leg of the first bracket so that the second end of the first bracket is connected to the first end of the second bracket;

(e) mounting the golf bag on the golf cart wherein the first bracket provides support for a bottom portion of the golf bag; and (f) attaching the container on the second end of the second bracket so that the container is adjacent the golf bag on a side opposite the golf cart.

26. The method of claim 25 wherein at least one sleeve is provided for mounting on a side of the container and wherein to attach the container on the second end of the second bracket, the sleeve is slid over the leg of the second bracket at the second end.

* * * * *